(12) United States Patent
Feldman et al.

(10) Patent No.: US 10,528,661 B2
(45) Date of Patent: Jan. 7, 2020

(54) EVALUATING PARSE TREES IN LINGUISTIC ANALYSIS

(71) Applicant: International Business Machines Corporation, Armonk, NY (US)

(72) Inventors: Yishai A. Feldman, Tel Aviv (IL); Eyal Shnarch, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 15/041,078

(22) Filed: Feb. 11, 2016

(65) Prior Publication Data

US 2017/0235719 A1    Aug. 17, 2017

(51) Int. Cl.
*G06F 17/21* (2006.01)
*G06F 17/27* (2006.01)

(52) U.S. Cl.
CPC ...... *G06F 17/2715* (2013.01); *G06F 17/2785* (2013.01)

(58) Field of Classification Search
USPC ............................................. 704/7–10, 257
See application file for complete search history.

(56) References Cited

U.S. PATENT DOCUMENTS

| | | | |
|---|---|---|---|
| 6,618,725 B1* | 9/2003 | Fukuda | G06F 17/30719 |
| 7,143,036 B2 | 11/2006 | Weise | |
| 7,305,336 B2* | 12/2007 | Polanyi | G06F 17/30719 704/1 |
| 7,475,006 B2* | 1/2009 | Weise | G06F 17/271 704/2 |
| 7,827,028 B2 | 11/2010 | Miller | |
| 7,962,904 B2 | 6/2011 | Zabokritski | |
| 8,140,323 B2 | 3/2012 | Johnson et al. | |
| 8,660,969 B1 | 2/2014 | Hall et al. | |
| 2003/0216904 A1* | 11/2003 | Knoll | G06F 17/271 704/9 |
| 2005/0137849 A1* | 6/2005 | Parkinson | G06F 17/2715 704/4 |
| 2006/0280370 A1 | 12/2006 | Viola et al. | |
| 2007/0143442 A1* | 6/2007 | Zhang | G06Q 10/107 709/217 |
| 2008/0162513 A1* | 7/2008 | Biard | G06F 17/2705 |
| 2008/0221870 A1 | 9/2008 | Attardi et al. | |

(Continued)

OTHER PUBLICATIONS

Amrouch et al., "Survey on the literature of ontology Mapping, Alignment and Merging.", 2012 International Conference on Information Technology and e-Services, 5 pages, 978-1-4673-1166-3/12, © 2012 IEEE.

(Continued)

*Primary Examiner* — Leonard Saint Cyr
(74) *Attorney, Agent, or Firm* — Aaron N. Pontikos (57) ABSTRACT

A computer-implemented method includes identifying at least one parse tree. The method includes identifying a pattern library. The method includes searching the pattern library for patterns that match at least one fragment of any of the at least one parse tree. The method includes determining whether the at least one parse tree is fully matched by a combination of matching patterns from the pattern library. The method includes ranking the at least one parse tree based on an extent to which the at least one parse tree is fully matched by the combination of matching patterns from the pattern library.

18 Claims, 4 Drawing Sheets

(56) References Cited

U.S. PATENT DOCUMENTS

| | | | | |
|---|---|---|---|---|
| 2009/0222407 | A1* | 9/2009 | Takuma | G06F 17/30684 |
| 2013/0297216 | A1* | 11/2013 | Hirst | G06F 19/3443 |
| | | | | 702/19 |
| 2016/0188564 | A1* | 6/2016 | Lobez Comeras | G06F 17/28 |
| | | | | 704/9 |
| 2016/0188570 | A1* | 6/2016 | Lobez Comeras | G06F 17/28 |
| | | | | 704/9 |
| 2016/0239480 | A1 | 8/2016 | Larcheveque et al. | |
| 2018/0293221 | A1 | 10/2018 | Finkelstein et al. | |

OTHER PUBLICATIONS

Charniak et al., "Coarse-to-fine n-best parsing and MaxEnt discriminative reranking", Brown Laboratory for Linguistic Information Processing (BLLIP), Brown University, Providence, RI 02912, Proceedings of the 43rd Annual Meeting of the ACL, pp. 173-180, Ann Arbor, Jun. 2005, © 2005 Association for Computational Linguistics.

Collins, Michael, "Discriminative Reranking for Natural Language Parsing", AT&T Labs—Research, Rm A-253, Shannon Laboratory, 180 Park Avenue Florham Park, NJ 07932, retrieved on Dec. 3, 2015, 8 pages, <http://www.ai.mit.edu/courses/6.891-nlp/ASSIGNMENT1/t2.1.pdf>.

Gal et al., "Completeness and Ambiguity of Schema Cover", OTM 2013, LNCS 8185, pp. 241-258, 2013, © Springer-Verlag Berlin Heidelberg 2013, <http://link.springer.com/chapter/10.1007%2F978-3-642-41030-7_15>.

Galitsky, Boris, "Machine Learning of Syntactic Parse Trees for Search and Classification of Text", eBay, Inc., San Jose CA USA, 45 pages, retrieved on Dec. 3, 2015, <http://robingets.me/robinlabs/html/assets/whitepapers/mlSentParseTreeSearchClassifProblems_EAAI_R2.pdf>.

Gildea, Daniel, "Loosely Tree-Based Alignment for Machine Translations", University of Pennsylvania, 8 pages, retrieved on Dec. 3, 2015, <http://www.cs.rochester.edu/~gildea/gildea-acl03.pdf>.

Hall et al., "Training Structured Prediction Models with Extrinsic Loss Functions", retrieved on Dec. 3, 2015, pages 1-6, <http://static.googleusercontent.com/media/research.google.com/en//pubs/archive/37629.pdf>.

Kimelfeld et al., "Matching Twigs in Probabilistic XML*", *This research was supported by The Israel Science Foundation (Grant 893/05), VLDB '07, Sep. 23-28, 2007, Vienna, Austria, Copyright 2007 VLDB Endowment, ACM 978-1-59593-649-3/07/09, pp. 27-38.

Li et al., "Holistically Twig Matching in Probabilistic XML", IEEE International Conference on Data Engineering, pp. 1649-1656, DOI 10.1109/ICDE.2009.147, 1084-4627/09, © 2009 IEEE.

McCord et al., "Deep parsing in Watson", IBM J. Res. & Dev., vol. 56, No. 3/4, Paper 3, May/July. 2012, Digital Object Identifier: 10.1147/JRD.2012.2185409d, pp. 3:1-3:15, © Copyright 2012 by International Business Machines Corporation.

Son et al., "An Ontology Alignment Based on Parse Tree Kernel for Combining Structural and Semantic Information Without Explicit Enumeration of Features", 2008 IEEE/WIC/ACM International Conference on Web Intelligence and Intelligent Agent Technology, pp. 468-474, 978-0-7695-3495-1/08, © 2008 IEEE, DOI 10.1109/WIIAT.2008.239.

Tiedemann, Joerg, "Lingua::Align—a toolbox for Tree Alignment", 11 pages, Copyright (C) 2009, 2010 by Joerg Tiedemann, Gideon KotzÃ ©, <http://stp.lingfil.uu.se/~joerg/Lingua/>.

Xu et al., "Applying Semantic-based Probabilistic Context-Free Grammar to Medical Language Processing —A Preliminary Study on Parsing Medication Sentences", Published online Aug. 12, 2011, doi: 10.1016/j.jbi.2011.08.009, 10 pages, <http://www.ncbi.nlm.nih.gov/pmc/articles/PMC3226929/>.

Zhang et al., "A Tree-to-Tree Alignment-based Model for Statistical Machine Translation", retrieved on Dec. 3, 2015, 8 pages, <http://citeseerx.ist.psu.edu/viewdoc/download?doi=10.1.1.150.9566&rep=rep1&type=pdf>.

* cited by examiner

EVALUATING PARSE TREES IN LINGUISTIC ANALYSIS

BACKGROUND

The present invention relates generally to the field of computational linguistics, and more particularly to evaluating parse trees.

Computational linguistics is concerned with the statistical or rule-based modeling of natural language. Using parse trees computational linguistics includes identifying parts of speech within a sentence, such as whether a word is a noun or a verb, as well as identify morphemes within words which may indicate tense or other modifiers.

SUMMARY

A computer-implemented method includes identifying at least one parse tree. The method includes identifying a pattern library. The method includes searching the pattern library for patterns that match at least one fragment of any of the at least one parse tree. The method includes determining whether the at least one parse tree is fully matched by a combination of matching patterns from the pattern library. The method includes ranking the at least one parse tree based on an extent to which the at least one parse tree is fully matched by the combination of matching patterns from the pattern library. A corresponding computer program product and computer system are also disclosed.

DETAILED DESCRIPTION

Parse trees may model fragments within a sentence. Applications may use patterns to identify parts of a sentence that are meaningful for that application. For example, a pattern may be semantic, such as a conditional phrase, a requirement phrase, or a negated phrase. Libraries of parse trees may be collected and organized to look for potential patterns and attempt to understand new sentences. Such libraries can be application specific.

Statistical parsers may produce more than one parse tree for a given sentence. The parsers assign a numerical score to each parse tree, but the correct parse tree is not necessarily the one with the highest rank. In some applications, the sentence to be parsed is a result of another process, such as a speech-to-text engine that interprets spoken language. The speech-to-text engine may produce several textual sentences for each spoken utterance, with associated scores. The correct textual representation is not always the one with the highest score.

Applications that use parse trees may use patterns to match against parts of the parse trees. Each pattern may have an associated semantics, used by the application to perform its functions. Because sentences or utterances made to the application are expected to be meaningful to it, the patterns used by the application may be used to choose the most appropriate parse tree for that application. Parse trees may be ranked by the extent to which they match the patterns, with the highest rank going to the parse tree that best matches the application's patterns.

Figure 1:
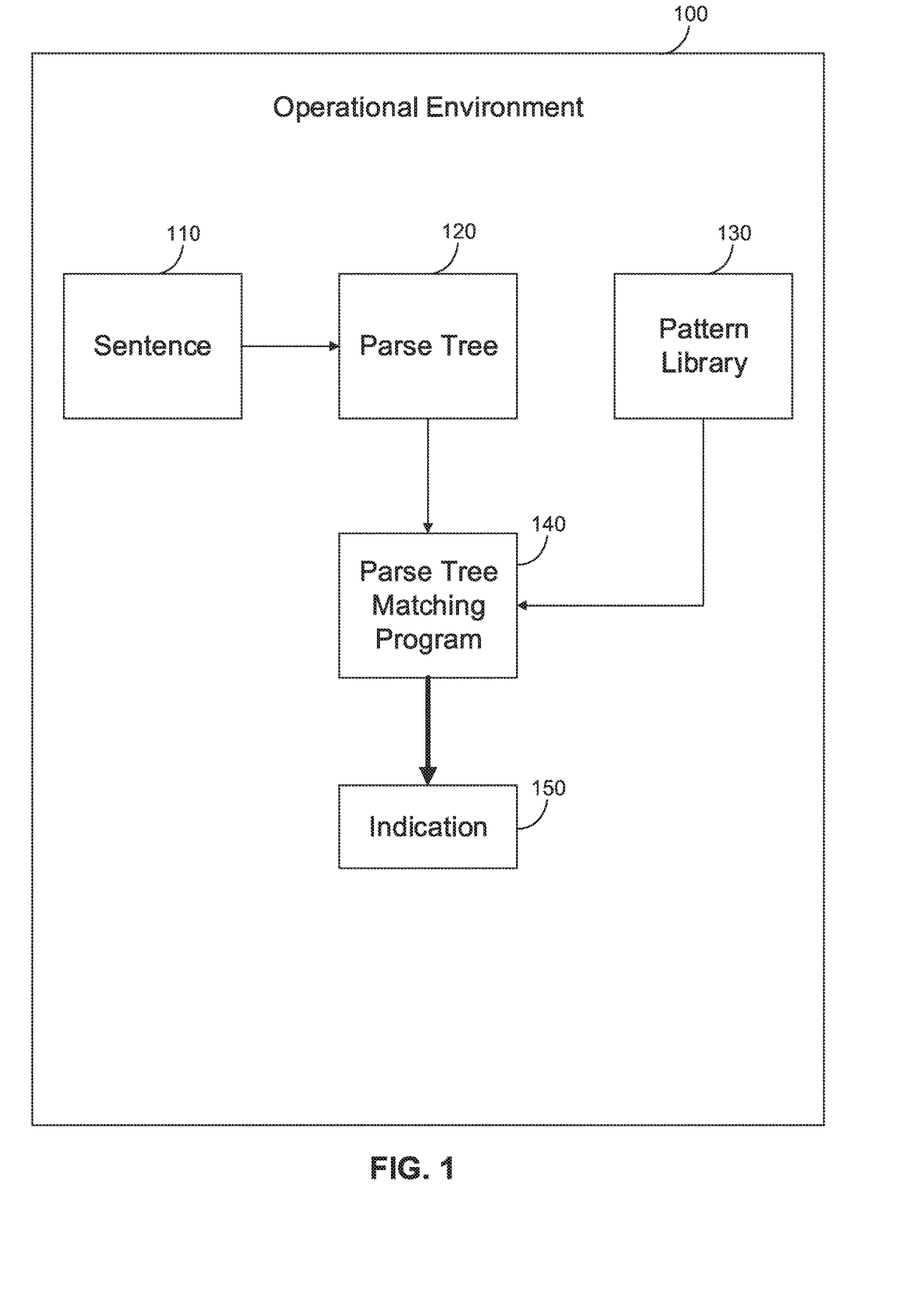
FIG. 1 is a block diagram of an operational environment suitable for operation of a parse tree matching program, in accordance with at least one embodiment of the present invention.

Referring now to the invention in more detail, FIG. 1 is a block diagram displaying an exemplary computing environment suitable for operation of at least one embodiment of the invention, generally designated an operational environment 100. The operational environment 100 includes a sentence 110, a parse tree 120, a pattern library 130, a parse tree matching program 140, and an indication 150, all in mutual communication and interconnected via the operational environment 100. The operational environment 100 may be a cloud-based, virtual, or distributed environment, a remote environment on defined server hardware, or, more generally, the operational environment 100 may be any type of environment suitable for access by the parse tree matching program 140.

The sentence 110 is a linguistic unit consisting of one or more words that are grammatically linked. The sentence 110 may include words grouped to express a statement, question, exclamation, request, command, and/or suggestion. The sentence 110 is a set of words that tell or attempt to tell a complete thought. The sentence 110 is expressed in a natural language, such as English. The parse tree matching program 140 may identify the sentence 110.

The parse tree 120 is a derivation tree or a syntax tree. The parse tree 120 is an ordered, rooted tree that represents a syntactic structure for sentences, such as the sentence 110. The parse tree 120 may be constructed based on either a constituency relation of constituency grammars or a dependency relation of dependency grammars. The parse tree 120 may identify each word within the sentence 110. For example, the parse tree 120 may identify what part of speech (noun, verb, adjective, etc.) a word within the sentence 110 is. The parse tree 120 may identify prefixes, suffixes, infixes, and/or other affixes within the sentence 110. For example in the word "preheating" the parse tree 120 may identify "preheating" as a verb, "pre-" as a prefix, "heat" as a noun, and "-ing" as a suffix. The parse tree 120 has fragments. The fragments are a portion of the parse tree 120. In the previous example, identifying "pre-" as a prefix is a fragment, identifying each morpheme within the word "preheating" is a fragment, and identifying "preheating" as a verb is a fragment.

The parse tree 120 corresponds to a sentence, such as the sentence 110. The parse tree 120 may contain semantic patterns for the sentence 110, such as a conditional, a negation, a direction, a duration, or an obligation. For example in a sentence "if he falls call for help" the parse tree 120 contains the phrase "if he falls" as a conditional. In another example, in a phrase "not calling" the parse tree 120 contains a negation of calling. In another example, the phrase "pass the phone from him to her" in the parse tree 120 denotes a direction from him to her. In another example, a phrase "call her for three hours" in the parse tree 120 denotes a duration of three hours. In another example, a phrase "you must call her" in the parse tree 120 denotes an obligation to call her.

The pattern library 130 is a collection of parse tree patterns. The pattern library 130 includes patterns that are comparable to subtrees of parse trees, such as the parse tree 120. For example, a pattern that finds conditional statements in the pattern library 130 may match a subtree whose root is a verb, the root having a prepositional modifier with one of the prepositions "if", "when", or "whenever". In another example, a pattern that finds a thematic role for direction may match a subtree whose root is a verb, the verb having a complement with a preposition "to," indicating motion, with the preposition having an object that is a noun.

The indication 150 is an alert, notification, or other means of presenting to a user information about the sentence 110. In some embodiments, the indication 150 contains information about whether each fragment of the parse tree 120 for the sentence 110 has a matching pattern within the pattern library 130. Each fragment of the sentence 110 is represented by a subtree within the parse tree 120. The indication 150 may indicate that each subtree of the parse tree 120 corresponds to a matching pattern within the pattern library 130. In such an embodiment, the indication 150 may be that the sentence 110 is understood. In some embodiments, the indication 150 may be that the sentence 110 is a correct expression of an audio utterance. In some embodiments, the indication 150 may be that a parse tree better corresponds to the sentence 110. In other embodiments, the indication 150 may be an indication that not every subtree of the parse tree 120 corresponds to a matching pattern within the pattern library 130. In such an embodiment, the indication 150 may be that the sentence 110 is not understood. Such an indication may include rejecting the sentence 110. Rejecting the sentence 110 may include producing an error message, removing the sentence 110 from a list of sentences, prompting a user for input, presenting a status to a user, or marking the sentence 110 as not understood and/or rejected.

The parse tree matching program 140 may identify the sentence 110, receive the parse tree 120, and the pattern library 130 as input, and generate the indication 150 as output. The parse tree matching program 140 may be a dedicated parse tree matching program, a function integrated within another program, or any other program or function that may communicate with the parse tree 120, and the pattern library 130.

Figure 2:
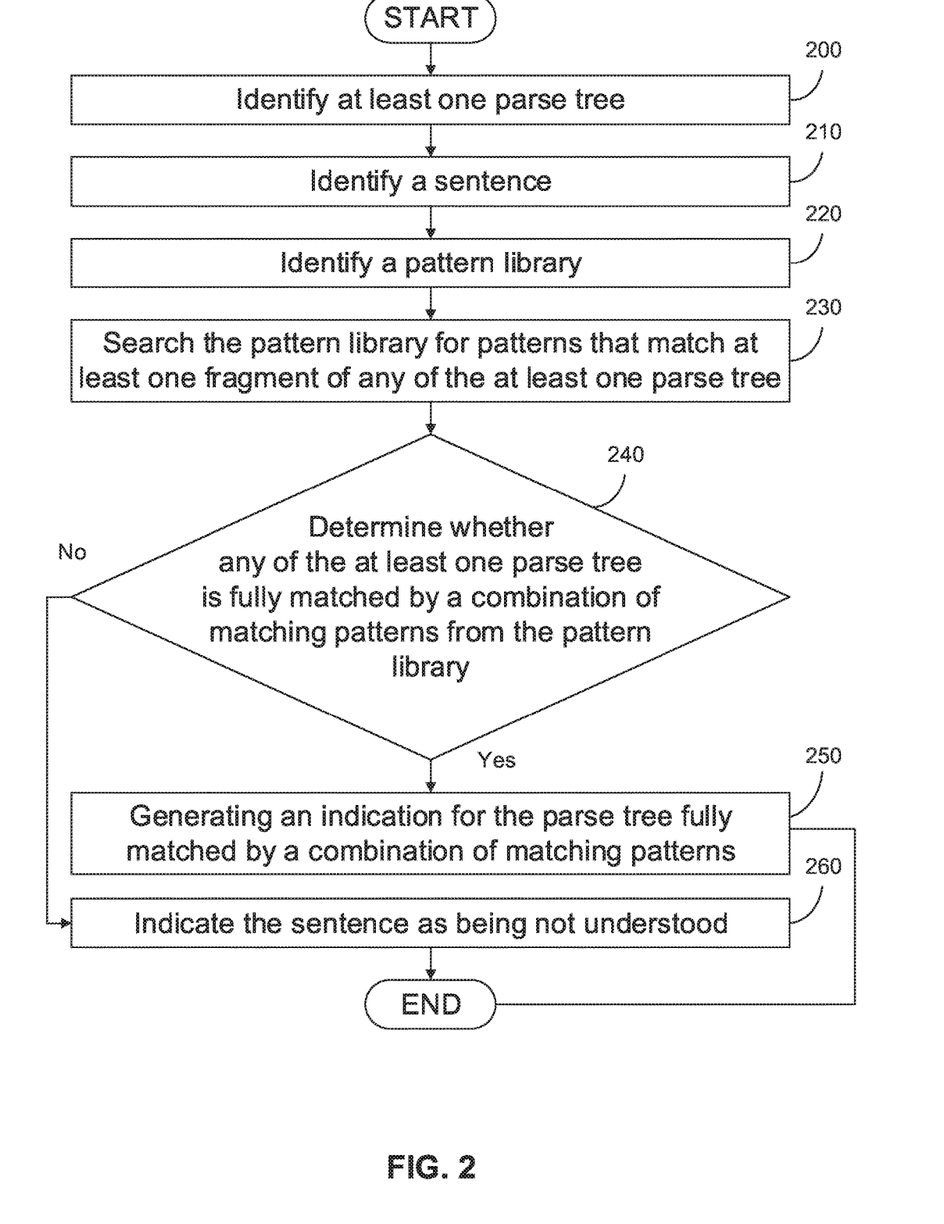
FIG. 2 is a flowchart depicting operational steps for a parse tree matching program, in accordance with at least one embodiment of the present invention.

FIG. 2 is a flowchart depicting the operational steps of the parse tree matching program 140, executing within the operational environment 100 of FIG. 1, in accordance with an embodiment of the present invention.

At step 200 the parse tree matching program 140 identifies at least one parse tree, such as the parse tree 120. Identifying may include a user explicitly calling the parse tree matching program 140 from a command line interface using a reference to the parse tree 120 as an argument. Alternatively, receiving may include automated calls to the parse tree matching program 140, for example, from an integrated development environment or as part of a parse tree matching management system.

At step 210 the parse tree matching program 140 identifies the sentence 110.

At step 220 the parse tree matching program 140 identifies the pattern library 130.

At step 230 the parse tree matching program 140 searches the pattern library 130 for patterns that match at least one fragment of the parse tree 120. Searching may include an index scan or a segment scan. Searching may include the parse tree matching program 140 parsing the pattern library 130.

At step 240 the parse tree matching program 140 determines whether any of the at least one parse trees (identified at step 200) are fully matched by a combination of patterns from the pattern library 130. The parse tree matching program 140 may search the pattern library 130 for patterns. This determination may compare nodes of the parse tree 120 to patterns within the pattern library 130. A parse tree is fully matched by a combination of patterns from the pattern library 130 if each node of the parse tree corresponds to a pattern from the pattern library 130. For example, a parse tree may have three branches: a subject noun phrase, a verb phrase, and an object noun phrase. In some embodiments, the parse tree is fully matched if the pattern library 130 includes a pattern or combination of patterns corresponding to the subject noun phrase pattern, the verb phrase pattern, and the object noun phrase pattern.

If each node of the parse tree 120 is matched to a pattern within the pattern library 130 the parse tree matching program 140 proceeds to step 250. At step 250 the parse tree matching program 140 generates the indication 150. In some embodiments, the indication 150 identifies the sentence 110 as being understood. In some embodiments, the indication 150 is a rank for the parse tree 120. In some embodiments, the indication 150 is a score for the parse tree 120.

If not every branch of the parse tree 120 is matched to a pattern within the pattern library 130 the parse tree matching program 140 proceeds to step 260. At step 260 the parse tree matching program 140 generates the indication 150 where the indication 150 indicates the sentence 110 is not understood. In some embodiments, the indication 150 includes a rank for the parse tree 120. In some embodiments, the indication 150 is a score for the parse tree 120.

Figure 3:
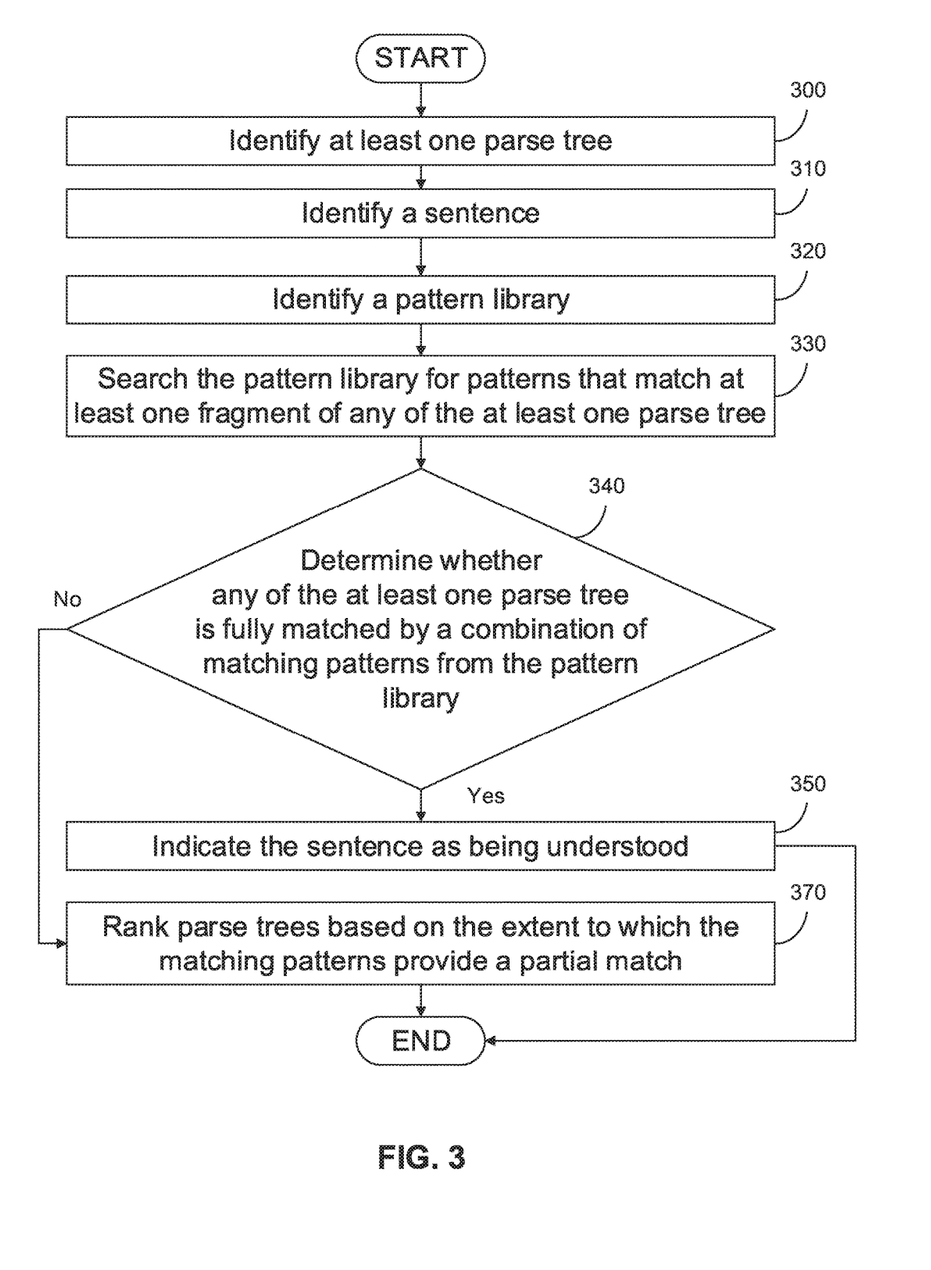
FIG. 3 is a flowchart depicting operational steps for a parse tree matching program, in accordance with at least one embodiment of the present invention where parse trees are ranked.

FIG. 3 is a flowchart depicting the operational steps of the parse tree matching program 140, executing within the operational environment 100 of FIG. 1, in accordance with an embodiment of the present invention, where parse trees are ranked.

The parse tree matching program 140 performs step 300, step 310, step 320, step 330, step 340, and step 350 in a manner similar to step 200, step 210, step 220, step 230, step 240, and step 250.

If not every branch of the parse tree 120 is matched to a pattern within the pattern library 130, the parse tree matching program 140 proceeds to step 370. At step 370 the parse tree matching program 140 ranks the parse tree 120 based on an extent to which matching patterns within the pattern library 130 provide a partial match. A parse tree is partially matched by a combination of patterns from the pattern library 130 if at least node of the parse tree corresponds to a pattern from the pattern library 130, but not each node of the parse tree corresponds to a pattern from the pattern library 130. For example, a parse tree may have three branches: a subject noun phrase, a verb phrase, and an object noun phrase. In some embodiments, the parse tree is partially matched if the pattern library 130 includes a pattern or combination of patterns corresponding to the subject noun phrase pattern and the verb phrase pattern, but does not include the object noun phrase pattern. In some embodiments the ranking may be a percentage. For example, if the sentence 110 has ten nodes in the parse tree 120 and eight of the nodes are matched to patterns within the pattern library 130, the parse tree may receive a ranking of eighty percent.

In some embodiments, the ranking may be based on identifying a root for the sentence 110. The root may be predetermined by a parser. The root node is a node that does not have any branches above it. In such embodiments where the ranking is based on identifying a root for the sentence 110, ranking may be based on identifying unmatched fragments and their proximity to the root of the sentence. For example, if an unmatched fragment is the root of the sentence or the word immediately preceding the root of the sentence, such a parse tree may receive a lower ranking score than a parse tree where an unmatched fragment is three or four words from the root of the sentence. In another example, distance may be based on distance within the parse tree 120, such as a number of branches between the unmatched fragment and the root of the sentence. Rankings may be based on multiple criteria including both an unmatched fragment's proximity to the root of a sentence and the number of unmatched fragments. A ranking system may utilize a predetermined weighting system.

Figure 4:
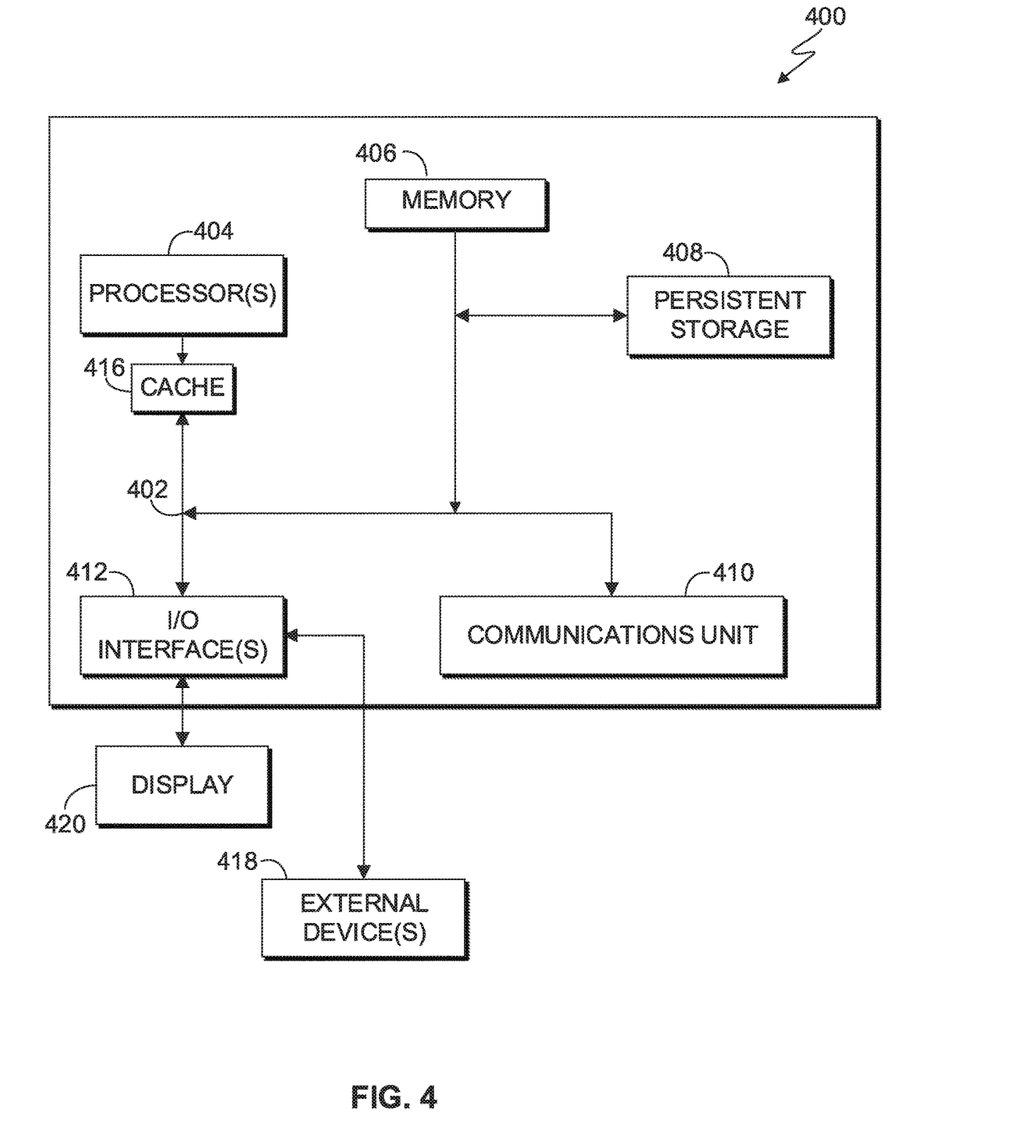
FIG. 4 is a block diagram of components of a computing apparatus suitable for executing a parse tree matching program, in accordance with at least one embodiment of the present invention.

FIG. 4 is a block diagram depicting components of a computer 400 suitable for executing the parse tree matching program 140. FIG. 4 displays the computer 400, the one or more processor(s) 404 (including one or more computer processors), the communications fabric 402, the memory 406, the RAM 416, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the parse tree matching program 140 may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The parse tree matching program 140 may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the computer-implemented method comprising:
   converting, by an application, a verbal communication into a set of parse trees, wherein:
      each parse tree in the set of parse trees corresponds to a different textual interpretation of the verbal communication;
      each parse tree in the set of parse trees includes a root node and one or more subtrees; and
      each subtree of the one or more subtrees corresponds to a text fragment associated with the verbal communication;
   receiving, by the application, a set of patterns, wherein each pattern in the set of patterns corresponds to a semantic pattern;
   comparing, by the application, each text fragment to each pattern in the set of patterns to yield one or more matching patterns, wherein any text fragment that does not yield a matching pattern is an unmatched text fragment;
   ranking, by the application, each parse tree in the set of parse trees, wherein each parse tree is ranked based on:
      a number of branches between an unmatched text fragment and the root node in a parse tree; and
      a number of the unmatched text fragments in the parse tree;
   processing, by the application, the verbal communication based on an interpretation of each matching pattern from the parse tree with a highest ranking.

2. The computer-implemented method of claim 1, wherein the parse tree that has the highest ranking has:
a least number of branches between each unmatched text fragment and the root node in the parse tree; and
the least number of unmatched text fragments in the parse tree.

3. The computer-implemented method of claim 2, wherein the parse tree that has the highest ranking does not need to be a most linguistically correct parse tree.

4. The computer-implemented method of claim 1, wherein each semantic pattern is selected from the group consisting of:
(a) a conditional pattern;
(b) a requirement pattern;
(c) a negation pattern;
(d) a directional pattern;
(e) a durational pattern; and
(f) an obligatory pattern.

5. The computer-implemented method of claim 1, wherein the application converts the verbal communication into the set of parse trees based, at least in part, by a speech-to-text engine.

6. The computer-implemented method of claim 1, wherein each parse tree is ranked based, at least in part, by a weighting system.

7. A computer program product comprising:
one or more computer readable storage media and program instructions stored on the one or more computer readable storage media, the program instructions comprising instructions to:
convert, by an application, a verbal communication into a set of parse trees, wherein:
each parse tree in the set of parse trees corresponds to a different textual interpretation of the verbal communication;
each parse tree in the set of parse trees includes a root node and one or more subtrees; and
each subtree of the one or more subtrees corresponds to a text fragment associated with the verbal communication;
receive, by the application, a set of patterns, wherein each pattern in the set of patterns corresponds to a semantic pattern;
compare, by the application, each text fragment to each pattern in the set of patterns to yield one or more matching patterns, wherein any text fragment that does not yield a matching pattern is an unmatched text fragment;
rank, by the application, each parse tree in the set of parse trees, wherein each parse tree is ranked based on:
a number of branches between an unmatched text fragment and the root node in a parse tree; and
a number of the unmatched text fragments in the parse tree;
process, by the application, the verbal communication based on an interpretation of each matching pattern from the parse tree with a highest ranking.

8. The computer program product of claim 7, wherein the parse tree that has the highest ranking has:
a least number of branches between each unmatched text fragment and the root node in the parse tree; and
the least number of unmatched text fragments in the parse tree.

9. The computer program product of claim 8, wherein the parse tree that has the highest ranking does not need to be a most linguistically correct parse tree.

10. The computer program product of claim 7, wherein each semantic pattern is selected from the group consisting of:
(a) a conditional pattern;
(b) a requirement pattern;
(c) a negation pattern;
(d) a directional pattern;
(e) a durational pattern; and
(f) an obligatory pattern.

11. The computer program product of claim 7, wherein the application converts the verbal communication into the set of parse trees based, at least in part, by a speech-to-text engine.

12. The computer program product of claim 7, wherein each parse tree is ranked based, at least in part, by a weighting system.

13. A computer system comprising:
one or more computer processors;
one or more computer readable storage media;
computer program instructions; and
the computer program instructions being stored on the computer readable storage media for execution by at least one of the one or more processors, the computer program instructions comprising instructions to:
convert, by an application, a verbal communication into a set of parse trees, wherein:
each parse tree in the set of parse trees corresponds to a different textual interpretation of the verbal communication;
each parse tree in the set of parse trees includes a root node and one or more subtrees; and
each subtree of the one or more subtrees corresponds to a text fragment associated with the verbal communication;
receive, by the application, a set of patterns, wherein each pattern in the set of patterns corresponds to a semantic pattern;
compare, by the application, each text fragment to each pattern in the set of patterns to yield one or more matching patterns, wherein any text fragment that does not yield a matching pattern is an unmatched text fragment;
rank, by the application, each parse tree in the set of parse trees, wherein each parse tree is ranked based on:
a number of branches between an unmatched text fragment and the root node in a parse tree; and
a number of the unmatched text fragments in the parse tree;
process, by the application, the verbal communication based on an interpretation of each matching pattern from the parse tree with a highest ranking.

14. The computer system of claim 13, wherein the parse tree that has the highest ranking has:
a least number of branches between each unmatched text fragment and the root node in the parse tree; and
the least number of unmatched text fragments in the parse tree.

15. The computer system of claim 14, wherein the parse tree that has the highest ranking does not need to be a most linguistically correct parse tree.

16. The computer system of claim 13, wherein each semantic pattern is selected from the group consisting of:
(a) a conditional pattern;
(b) a requirement pattern;
(c) a negation pattern;
(d) a directional pattern;

(e) a durational pattern; and
(f) an obligatory pattern.

17. The computer system of claim 13, wherein the application converts the verbal communication into the set of parse trees based, at least in part, by a speech-to-text engine.

18. The computer system of claim 13, wherein each parse tree is ranked based, at least in part, by a weighting system.

\* \* \* \* \*